(12) United States Patent
George et al.

(10) Patent No.: US 9,246,858 B2
(45) Date of Patent: *Jan. 26, 2016

(54) ENABLING PARTICIPATION IN AN ONLINE COMMUNITY USING VISUAL MACHINE-READABLE SYMBOLS

(71) Applicant: Facebook, Inc., Menlo Park, CA (US)

(72) Inventors: John-Alistair George, San Rafael, CA (US); Adam Connelly, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,632

(22) Filed: Jul. 16, 2015

(65) Prior Publication Data

US 2015/0326516 A1 Nov. 12, 2015

Related U.S. Application Data

(63) Continuation of application No. 14/516,504, filed on Oct. 16, 2014, which is a continuation of application No. 13/757,692, filed on Feb. 1, 2013, now Pat. No. 8,910,059, which is a continuation of application No. 12/913,733, filed on Oct. 27, 2010, now Pat. No. 8,407,621, which is a continuation of application No. 11/755,691, filed on May 30, 2007, now Pat. No. 7,849,411.

(60) Provisional application No. 60/803,501, filed on May 30, 2006, provisional application No. 60/803,506, filed on May 30, 2006.

(51) Int. Cl.
*G06F 3/0481* (2013.01)
*H04L 12/58* (2006.01)
*H04L 29/06* (2006.01)
*G06K 19/06* (2006.01)
*G06Q 30/02* (2012.01)

(52) U.S. Cl.
CPC ........ *H04L 51/046* (2013.01); *G06K 19/06028* (2013.01); *G06Q 30/0261* (2013.01); *H04L 65/403* (2013.01)

(58) Field of Classification Search
CPC ........ G06F 17/24; G06F 9/4443; G06F 3/00; G06F 3/048; G06F 3/0481; H04L 29/06; H04L 12/581; H04L 29/08072; G06Q 10/10; G06Q 30/0241; G06Q 50/01; G06Q 30/0251; G06Q 10/107
See application file for complete search history.

(56) References Cited

U.S. PATENT DOCUMENTS

| | | | | |
|---|---|---|---|---|
| 7,089,487 B2 * | 8/2006 | Tsai | | 715/208 |
| 7,306,143 B2 * | 12/2007 | Bonneau et al. | | 235/380 |
| 7,334,728 B2 * | 2/2008 | Williams | | 235/383 |
| 7,353,988 B1 * | 4/2008 | Ramachandran | | 235/379 |
| 7,599,844 B2 * | 10/2009 | King et al. | | 705/1.1 |
| 7,849,411 B1 * | 12/2010 | George et al. | | 715/758 |
| 2003/0051003 A1 * | 3/2003 | Clark et al. | | 709/218 |
| 2003/0158796 A1 * | 8/2003 | Balent | | 705/28 |

(Continued)

*Primary Examiner* — Xiomar L Bautista
(74) *Attorney, Agent, or Firm* — Fenwick & West LLP

(57) ABSTRACT

A facility for coordinating an online discussion is described. The facility receives an indication that a user has captured a machine-readable symbol encoding an identifier that identifies a particular online discussion. In response, the facility incorporates into an online forum that hosts this online discussion an indication that this user captured a symbol encoding an identifier that identifies this online discussion.

20 Claims, 25 Drawing Sheets

(56) References Cited

U.S. PATENT DOCUMENTS

2005/0219591 A1* 10/2005 Marggraff et al. ........... 358/1.12
2006/0026140 A1* 2/2006 King et al. ..................... 707/3
2006/0029296 A1* 2/2006 King et al. ..................... 382/313
2008/0301561 A1* 12/2008 Bain ............................. 715/730

* cited by examiner

CREATE YOUR PROFILE

Your Registration Confirmation Code will be sent as an SMS* to the phone number entered below.

Information collected here will only be used by smartpox.com and will never be sold or shared with any 3rd party vendors.

*Wireless carriers may charge fees for receiving text messages.

REQUIRED STUFF

- User Name _____ (12 chars remaining)
- Password _____ (12 chars remaining)
- Confirm password _____ (12 chars remaining)
- eMail address _____ (40 chars remaining)
- eMail display Make my email address visible to fellow Smartpox users? ● No ○ Yes
- Mobile # _____ (Required for sign up confirmation.)
- Mobile carrier [Please Select Your Mobile Carrier ▼]
- Choose a locale [Please Select a Locale ▼] (Your closest major city)

Agreement: I have read and accept the following Terms and Conditions ☐ Yes

Generate Confirmation Code

OPTIONAL STUFF

- Choose a photo _____ [Browse]

*FIG. 1*

CREATE STEP 2 OF 2

Note that this is the 'Last' step in the process. If all fields are correct you will post your smartpox. The only field you can change after you create the 'Smartpox' is the description field. All other fields will be locked. Please check all fields before you 'Create your Smartpox'.

SMARTPOX WEB URL FIELD

This 'Smartpox' gives the end user the option to either tag the output URL to his 'Spotted Box!' to view later, or to view the url directly from his phone.

Web Url: http://www.csua.berkeley.edu/yakura/stuff/boba.html (69 chars remaining) —601

Color: white ▼ (Select a background color for your Pox) —602

DESCRIBE YOUR SMARTPOX TO PEOPLE

Title: Exhaustive West-Coast Bubble Tea Ratings (7 chars remaining) —603

Smartpox Description: This correspondent has really poured himself into_i the search for great boba! —604
(922 chars remaining)

Choose a photo: [ Browse ] —605
(Formats allowed - PNG, Jpeg, TIFF, GIF and BMP at 600kb max.)

[< Step Back] [Create Smartpox] —606

*FIG. 6*

CREATE STEP 2 OF 2

Note that this is the 'Last' step in the process. If all fields are correct you will post your smartpox. The only field you can change after you create the 'Smartpox' is the description field. All other fields will be locked. Please check all fields before you 'Create your Smartpox'.

EMAIL ADDRESS FIELD
This 'Smartpox' gives the end user the option to either tag the output email to his 'Spotted Box' to review later, or to open an email to the recipient entered directly from his phone.

eMail Add: [billybob@hamstermail.com] (24 chars remaining)

Color: [white ▼] (Select a background color for your Pox)

DESCRIBE YOUR SMARTPOX TO PEOPLE

Title: [Email Billy, Bubble Tea Connoisseur] (13 chars remaining)

Smartpox Description: [Billy knows everything about bubble tea!]
(960 chars remaining)

Choose a photo: [C:\Documents and Setti] [Browse...]
(Formats allowed PNG, Jpeg, TIFF, GIF and BMP at 600kb max.)

[< Step Back] [Create SmartPox]

ENABLING PARTICIPATION IN AN ONLINE COMMUNITY USING VISUAL MACHINE-READABLE SYMBOLS

CROSS-REFERENCE TO RELATED APPLICATIONS

The present application is a Continuation Application of U.S. patent application Ser. No. 14/516,504, filed Oct. 16, 2014, which is a Continuation Application of U.S. patent application Ser. No. 13/757,692, filed Feb. 1, 2013, issued as U.S. Pat. No. 8,910,059 on Dec. 9, 2014, which is a Continuation Application of U.S. patent application Ser. No. 12/913,733, filed Oct. 27, 2010, issued as U.S. Pat. No. 8,407,621 on Mar. 26, 2013, which is a Continuation Application of U.S. patent application Ser. No. 11/755,691, filed May 30, 2007, issued as U.S. Pat. No. 7,849,411 on Dec. 7, 2010, which claims the benefit of U.S. Provisional Application No. 60/803,501, filed May 30, 2006, and U.S. Provisional Application No. 60/803,506, filed May 30, 2006, all of which are hereby incorporated by reference in their entireties.

TECHNICAL FIELD

The described technology is directed to the field of techniques for building and supporting online communities.

BACKGROUND

While online communities are becoming increasingly popular, members of conventional online communities tend to participate in them almost exclusively by accessing a web site provided by the online community using a web browser. This mode of participation can tend to limit the usefulness of and level of interest in conventional online communities.

In view of the foregoing, techniques for participating in an online community by performing interactions in the real world would have significant utility.

BRIEF DESCRIPTION OF THE DRAWINGS

FIGS. 1-23 are user interface diagrams showing typical displays presented the by facility as part of the community web site.

DETAILED DESCRIPTION

Figure 2:
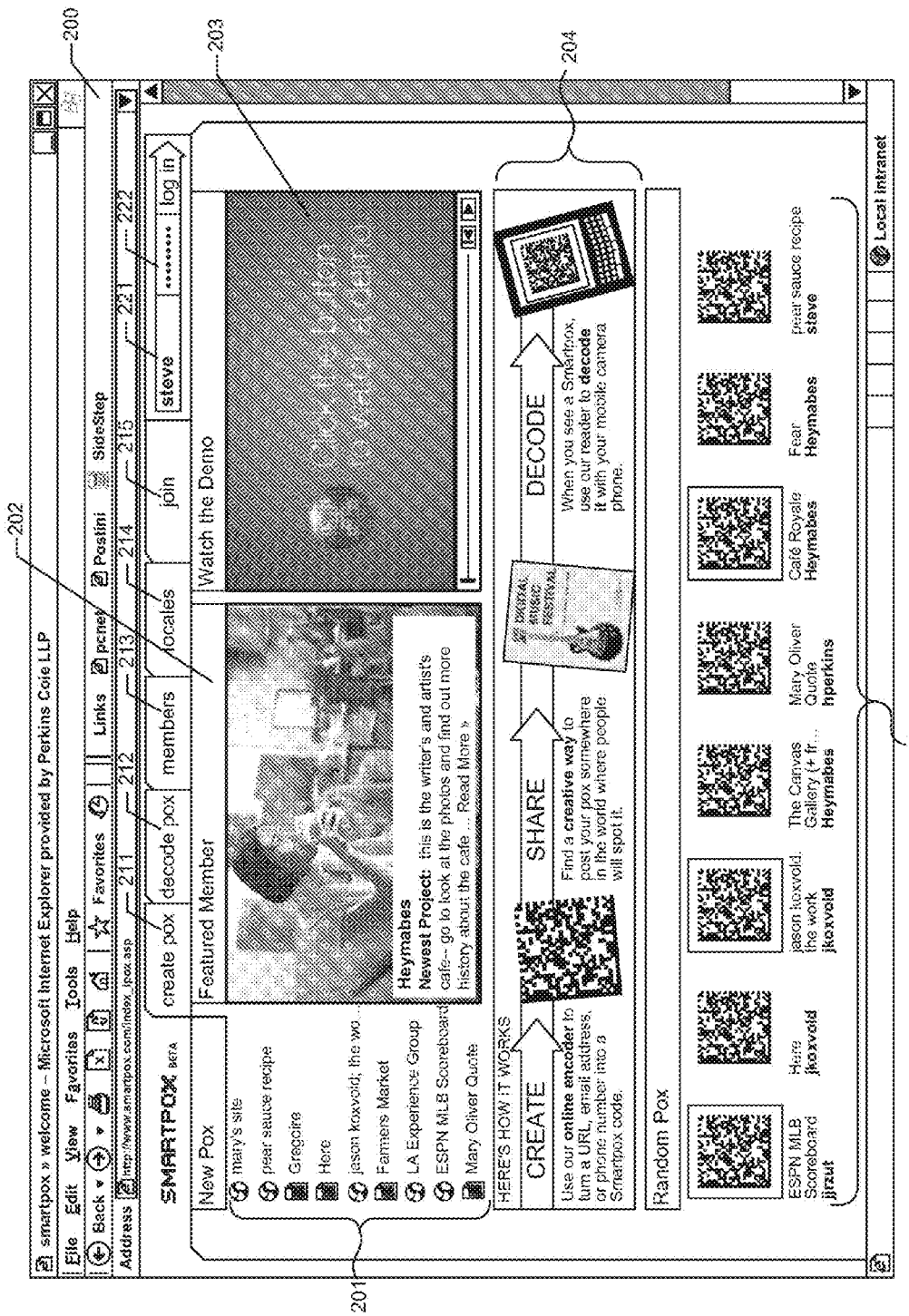

A software and/or hardware facility that enables participation in an online community using visual machine-readable symbols ("the facility") is described. In some embodiments, users of the community can interact with a community website to create content items that are available to some or all members of the community. For example, users may create restaurant reviews, musical artist descriptions, songs, documents, or virtually any other textual, graphical, audio, video, or other content. For each created content item, the facility assigns an identifier that uniquely identifies the content item among all of the content items created in the community, generates a two-dimensional barcode encoding the identifier, and permits the creating user to print out the barcode, and/or incorporate the barcode into a larger document that can be printed. For example, a user may create a restaurant review document for a restaurant, and tape a printed copy of the resulting barcode to the doorframe of the restaurant, or create a description of a band and incorporate the assigned barcode into a poster announcing an upcoming performance by the band.

When another user of the community encounters such a printed barcode, s/he can use an application installed on his or her cameraphone to optically capture and decode the barcode, communicate the user's capture of the barcode to a server, and optionally download the content item to the phone. In some embodiments, the server maintains a count and/or list of users who have captured each barcode. When the capturing user later visits the collaboration website, s/he can select the content item from a list of all of the content items whose barcodes the user has captured and display and interact with the content item, such as by commenting on it, annotating it, etc.

In some embodiments, the facility enables a user to encode other types of information into a barcode that can be read and decoded by the facility's cameraphone application. For example, a first user may encode a phone number into a barcode. When this barcode is captured by a second user's cameraphone, the cameraphone can call the encoded phone number. The first user may similarly encode an email address that the second user's cameraphone can use to address an email message.

In some embodiments, the facility displays advertising messages to a user, either on the user's cameraphone or within the context of the community web site, that are targeted based at least in part upon the set of symbols captured by the user.

In some embodiments, the facility supports a number of other special-purpose symbols, such as a symbol that a user may capture in order to add his or her email address to an email list, or otherwise join a discussion group about a particular subject. Also, in some embodiments, a user may capture a symbol from a shelf tag for an item at a store to receive a coupon for that item. In some cases, the facility can encode information into a symbol that is displayed on the display of a smart phone, such as a symbol encoding a coupon redemption code.

By performing in some or all of the ways described above, the facility enables the community to incorporate real-world interactions into the participation of users in the community.

FIGS. 1-23 are user interface diagrams showing typical displays presented the by facility as part of the community web site.

FIG. 1 shows a display presented by the facility in order to register a new user for the community. The display 100 includes user interface controls for entering information such as the following: a user name 101 used to identify the user; a password 102 used by the user to authenticate his or her identity to the facility; an email address 103 at which the user can receive email directed to the user; an indication 104 about whether the facility may share this email address with other users of the facility; a telephone number 105 for the user's smart phone; a mobile carrier 106 that provides wireless service to the cell phone; a geographic locale 107 in or near which the user resides or frequently visits; an indication 108 that the user has read agreements relating to the use of the facility; and a photo 110 portraying the user. After entering this information, the user selects control 109 in order to create a profile.

In response, the facility generates a confirmation code and transmits it to the user's cameraphone, such as in a text message or a voicemail message. When the user receives the confirmation code on his or her cameraphone, the user enters it into a subsequent display generated by the facility (not shown) to complete the creation of the user's profile.

In many cases, the user proceeds to use the community web site to download a symbol capture and processing program for installation on the user's smart phone. As part of the installation of this program, the user's user name or another identifier for the user is solicited from the user, and stored in a location in the cameraphone that is accessible to the capture program.

FIG. 2 shows a display presented by the facility to a member of the community containing the community's homepage. The homepage 200 has sections listing new discussions ("pox" or "smartpox") 201, identifying a featured member 202, presenting a web site demonstration video 203, showing a graphical community primer 204, and a list of randomly-selected discussions 205. The homepage also contains links that the user can follow to create a new discussion 211, learn how to capture and decode symbols 212, list members of the community 213, list different geographic areas in which the community is operative 214, and join the community 215. The user may also type a user ID 221 and password 222 into a login control in order to log in to the web site.

Figure 3:
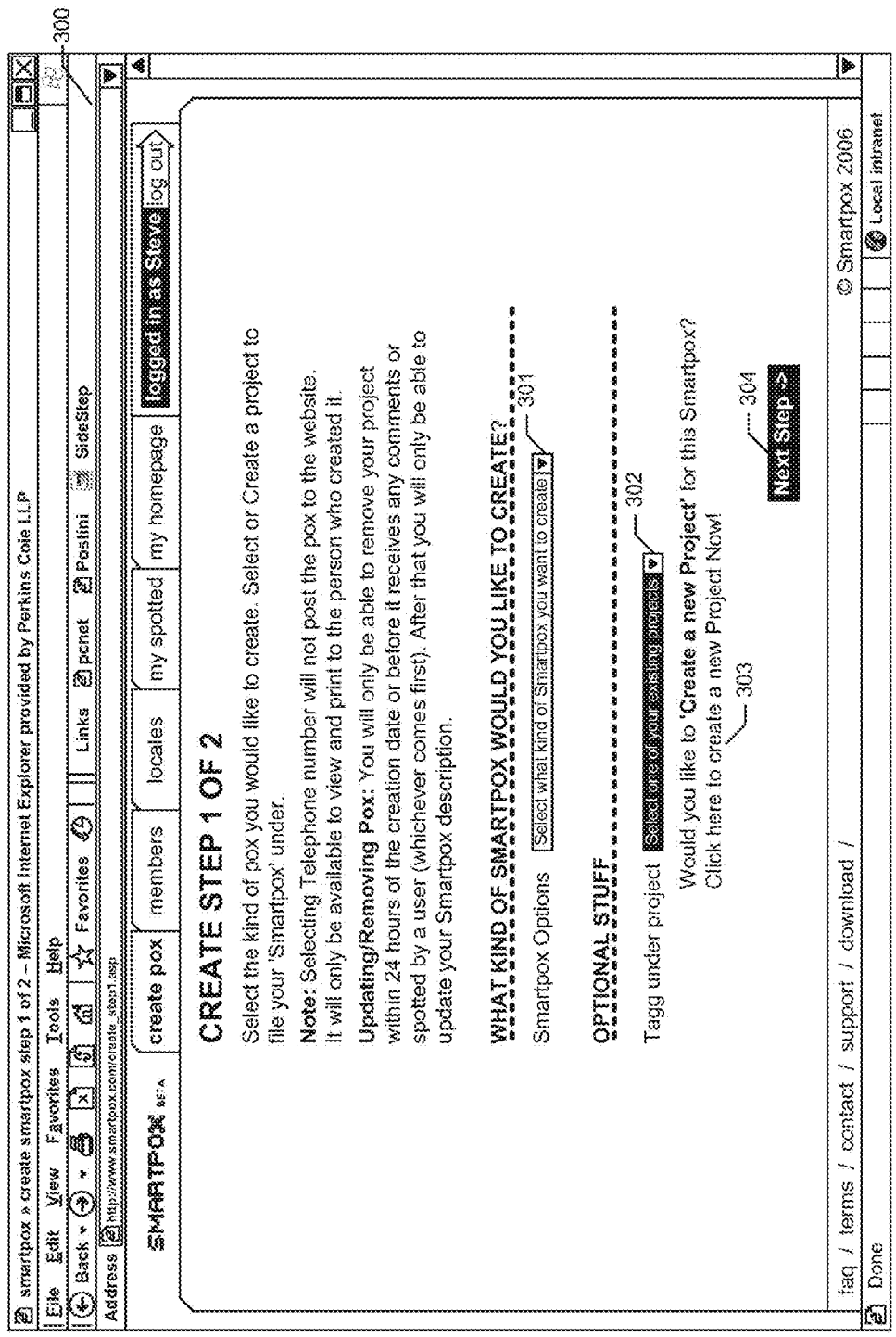

FIG. 3 shows a display presented by the facility when the user selects the "create pox" link to create a new discussion. This display 300 contains controls that the user may use in order to select a type of content for the discussion ("smart pox options") 301, select a group of discussions (a "project") 302 to which to add the new discussion, a create a new project 303, or proceed to the next step of the process of creating a new discussion 304.

Figure 4:
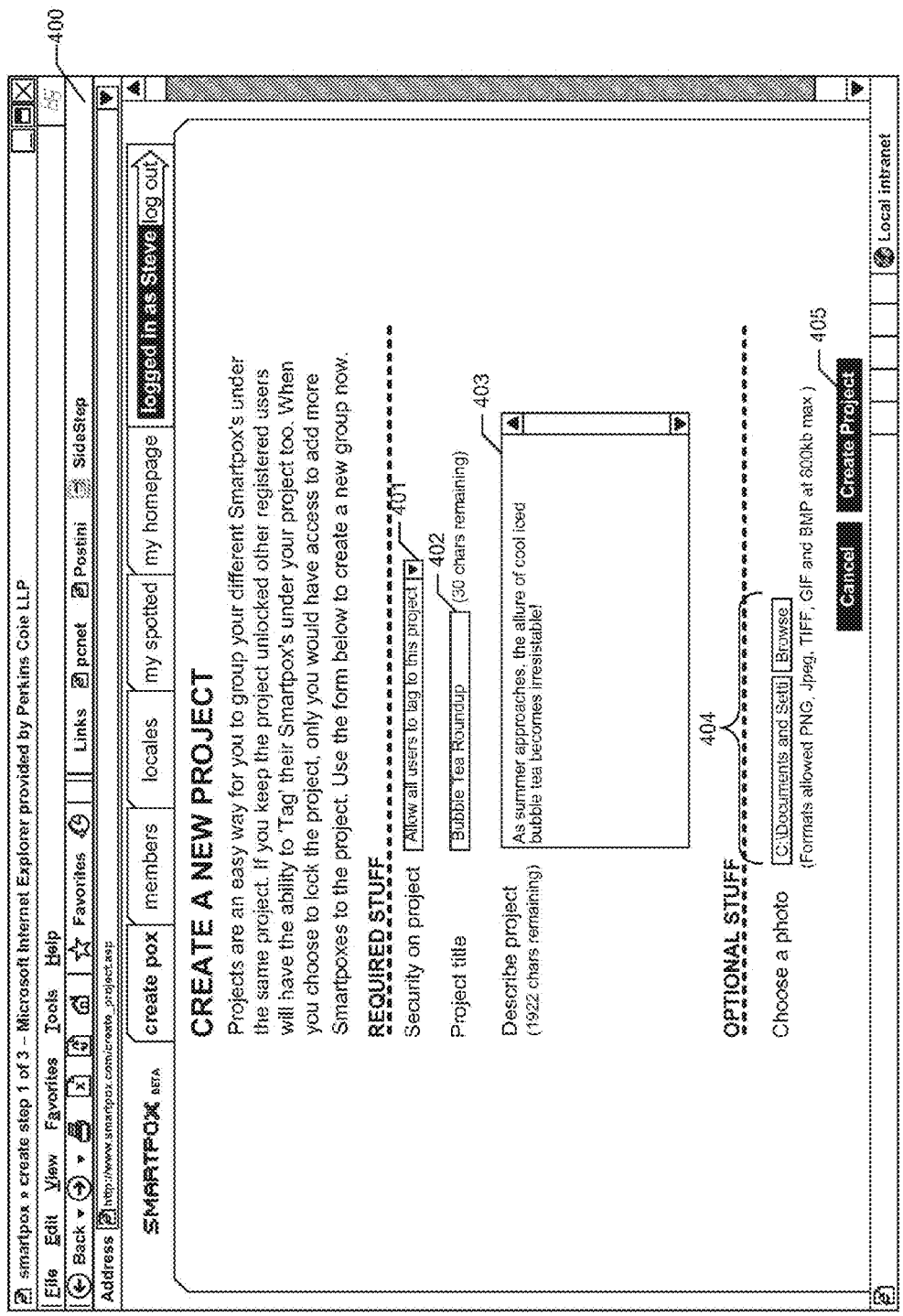

FIG. 4 shows a display presented by the facility when the user selects the "create a new project" link in the display of FIG. 4. The display 400 contains controls usable by the user to enter information about the project including whether all users can add discussions to this project ("security on a project") 401, the title of the project 402, a description of the project 403, and an image that visually represents the project 404. The display further includes a button 405 that the user can select in order to create a project with the attributes specified using the controls.

Figure 5:
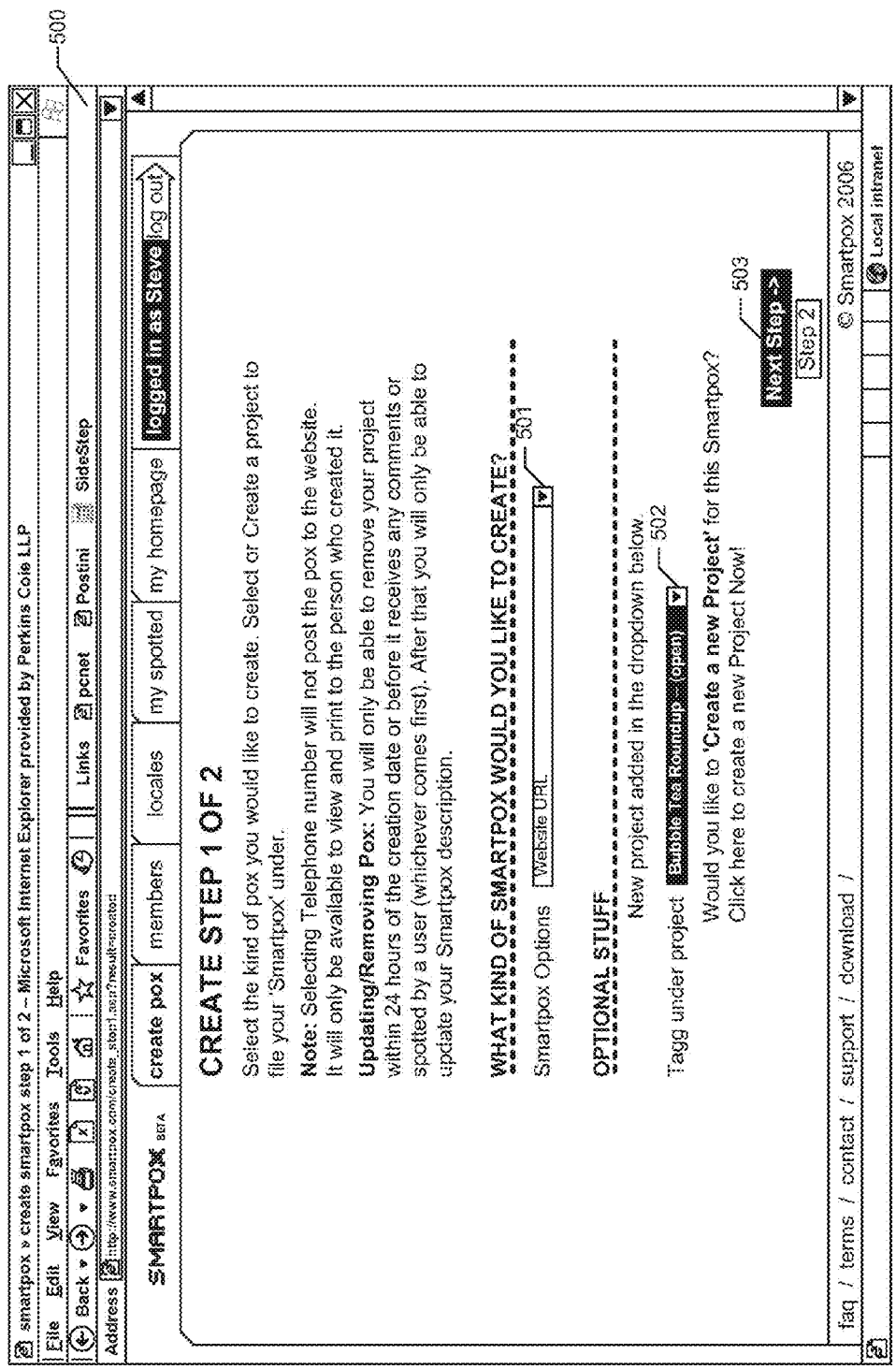

FIG. 5 shows a display presented by the facility after the user has created a new "Bubble Tea Roundup" project in FIG. 4. The display 500 shows a version of FIG. 3 in which this new project can be selected using the "Tagg under project" list box 502. The display also shows that the user has selected the "Website URL" content-type 501 for the new discussion being created. The display further includes a next step button 503 that the user may select in order to proceed to the next display for creating a new discussion.

FIG. 6 shows a display presented by the facility when the user selects the next step button shown in FIG. 5. The display 600 contains additional fields and controls usable by the user in order to further define the Website URL discussion being created, including a URL specified by a user 601, a background color to use in generating a symbol for the discussion 602, a title for the discussion 603, a description for the discussion 604, and an image illustrating the discussion 605. The display further includes a create smart pox button 606 that the user may select in order to create a new discussion with the specified attributes.

Figure 7:
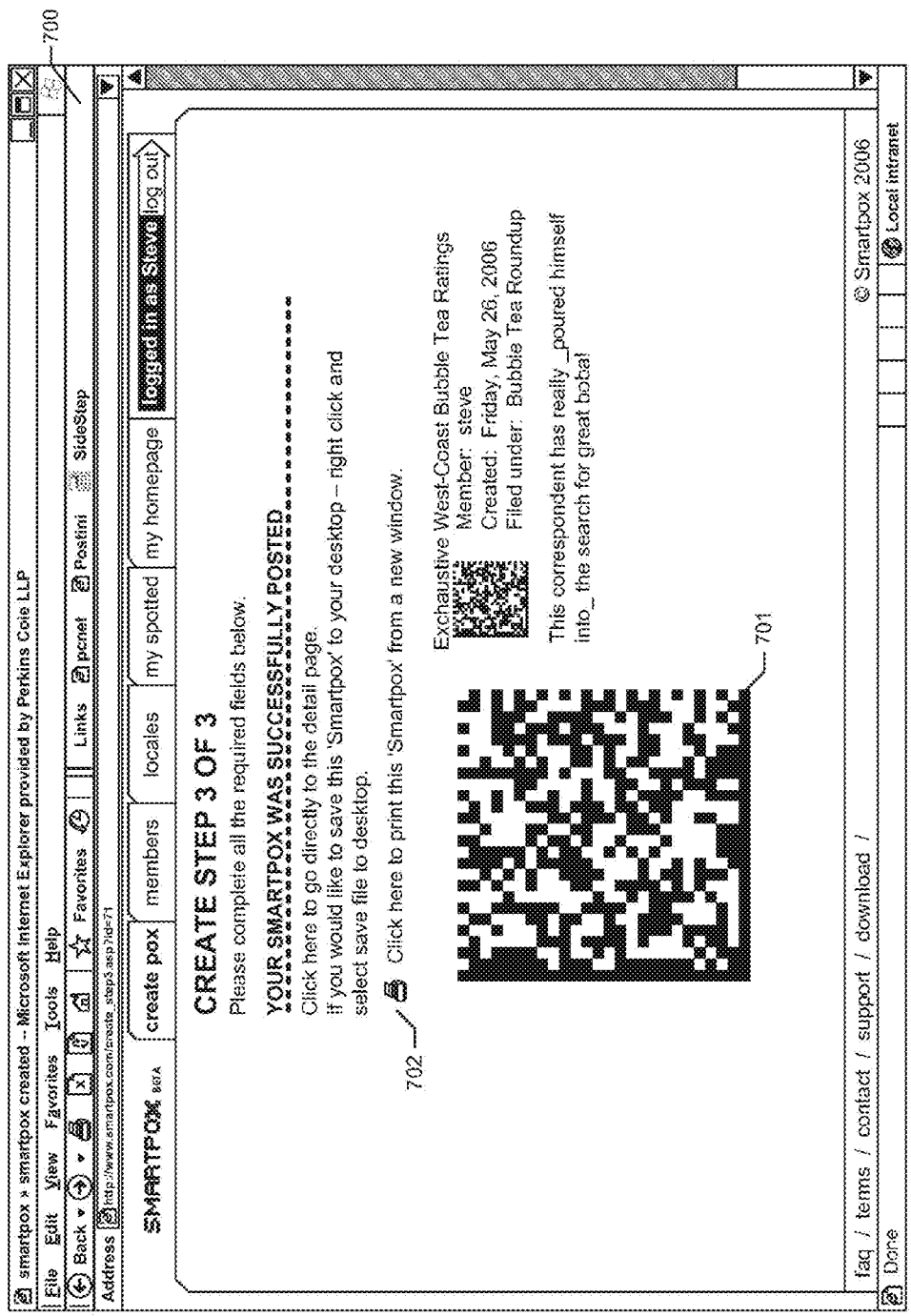

FIG. 7 shows a display presented by the facility in response to the user's selection of the create smart pox button in FIG. 6. This display 700 includes a symbol 701 generated to represent the created discussion, which the user may either print 702, save, or copy from this display onto the clipboard for pasting into an electronic document.

Figure 8:

FIG. 8 shows a display presented by the facility when the user selects the "click here to print this smart pox from a new window" link 702 in FIG. 7. The display 800 includes a send to printer button 801 that the user may select in order to print the symbol.

Figure 9:
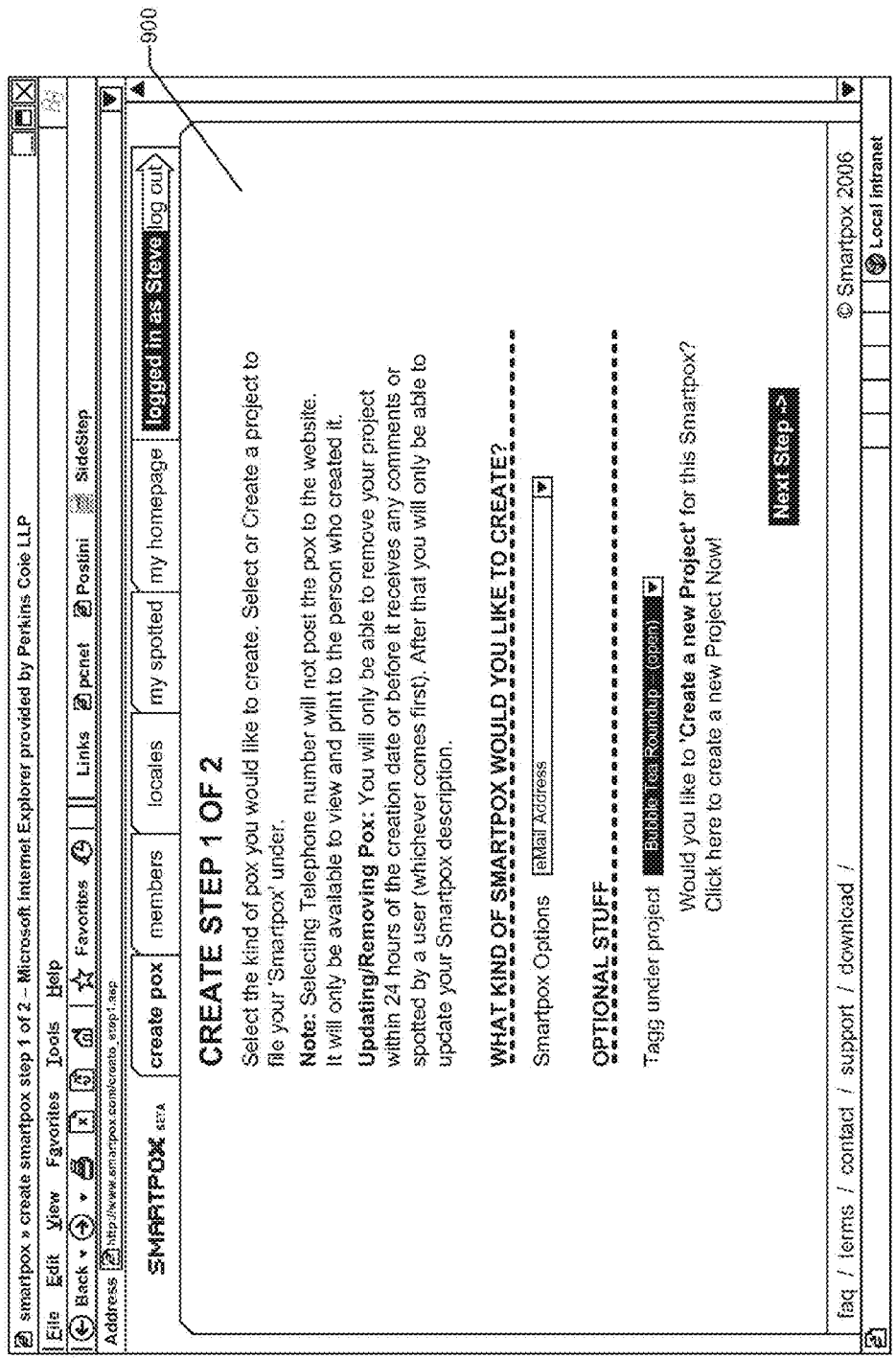
Figure 11:

FIGS. 9-11 show displays presented by the facility as part of the process of creating a new email address discussion, whose contents are similar to the displays shown in FIGS. 5-7.

Figure 12:
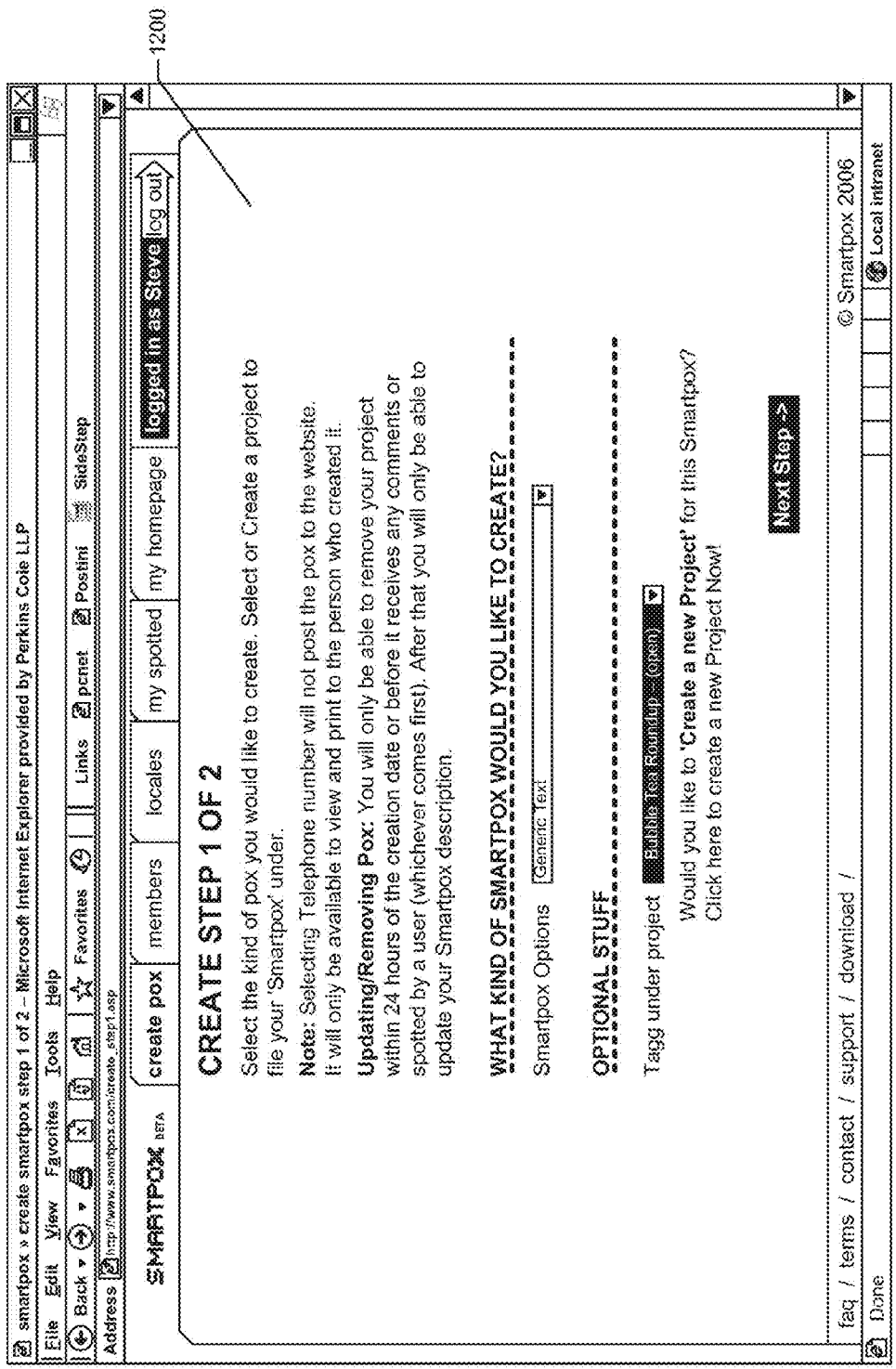
Figure 13:
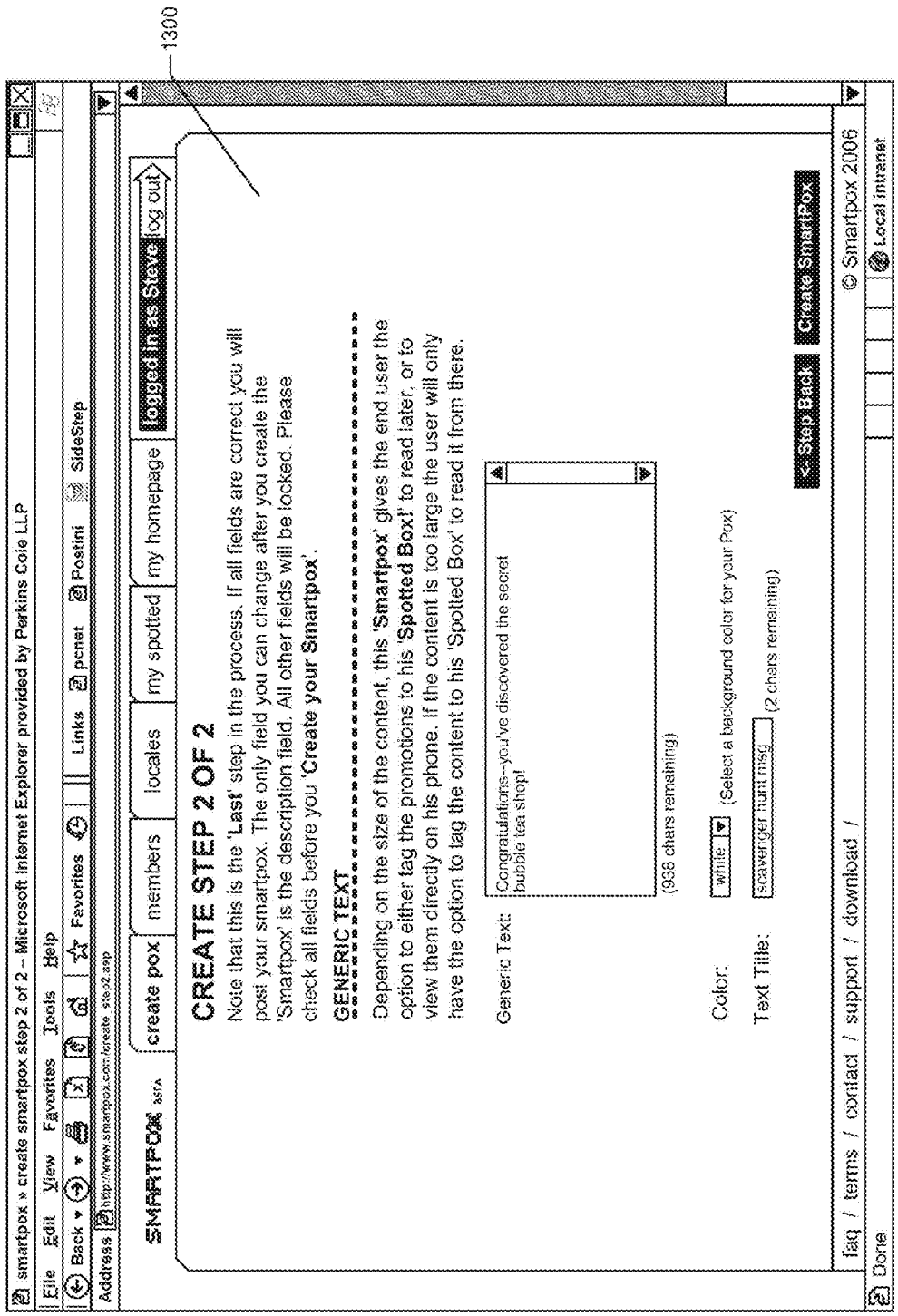
Figure 14:
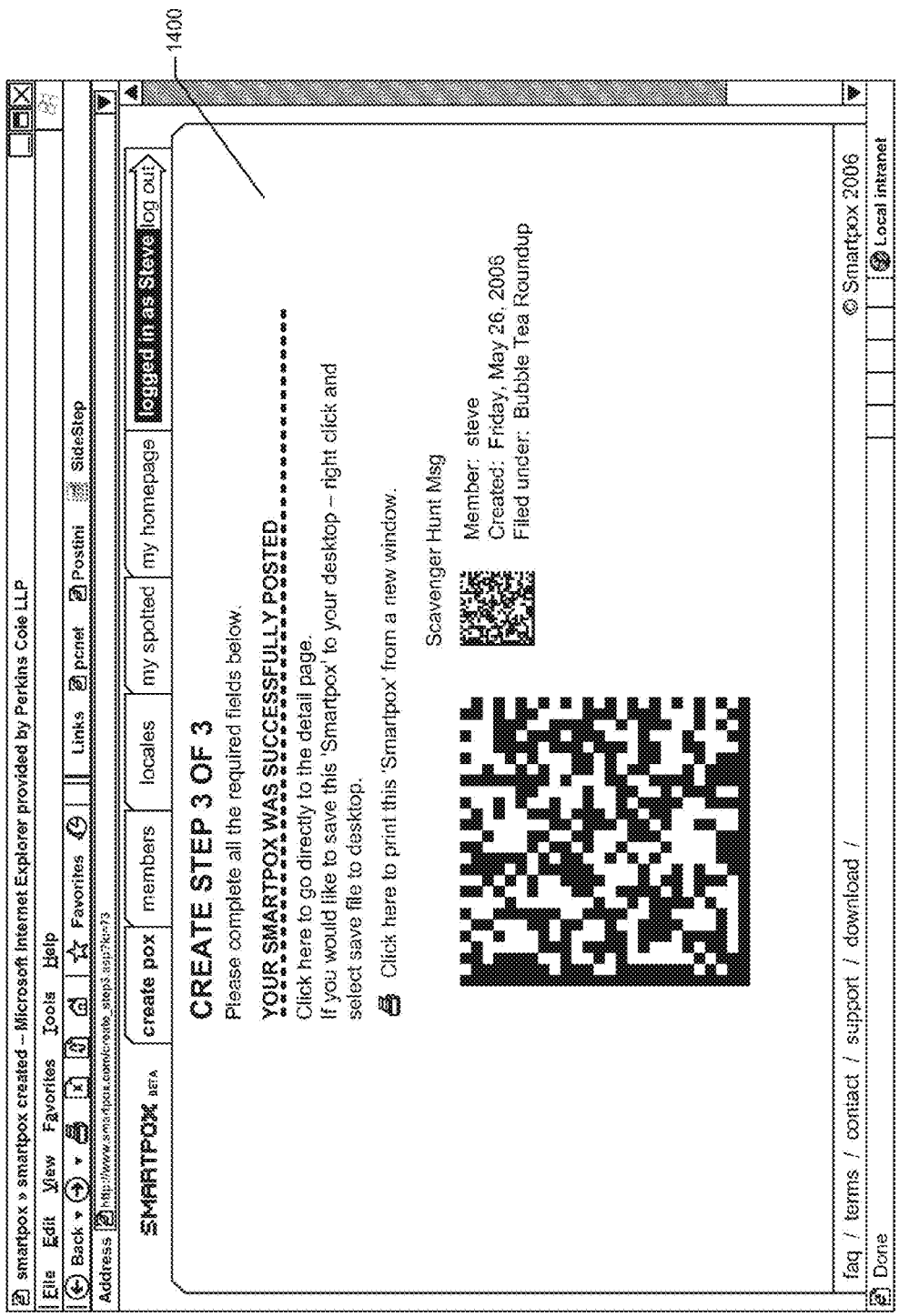

FIGS. 12-14 show displays presented by the facility as part of the creation of a new generic text discussion, whose contents are similar to the displays shown in FIGS. 5-8.

Figure 15:
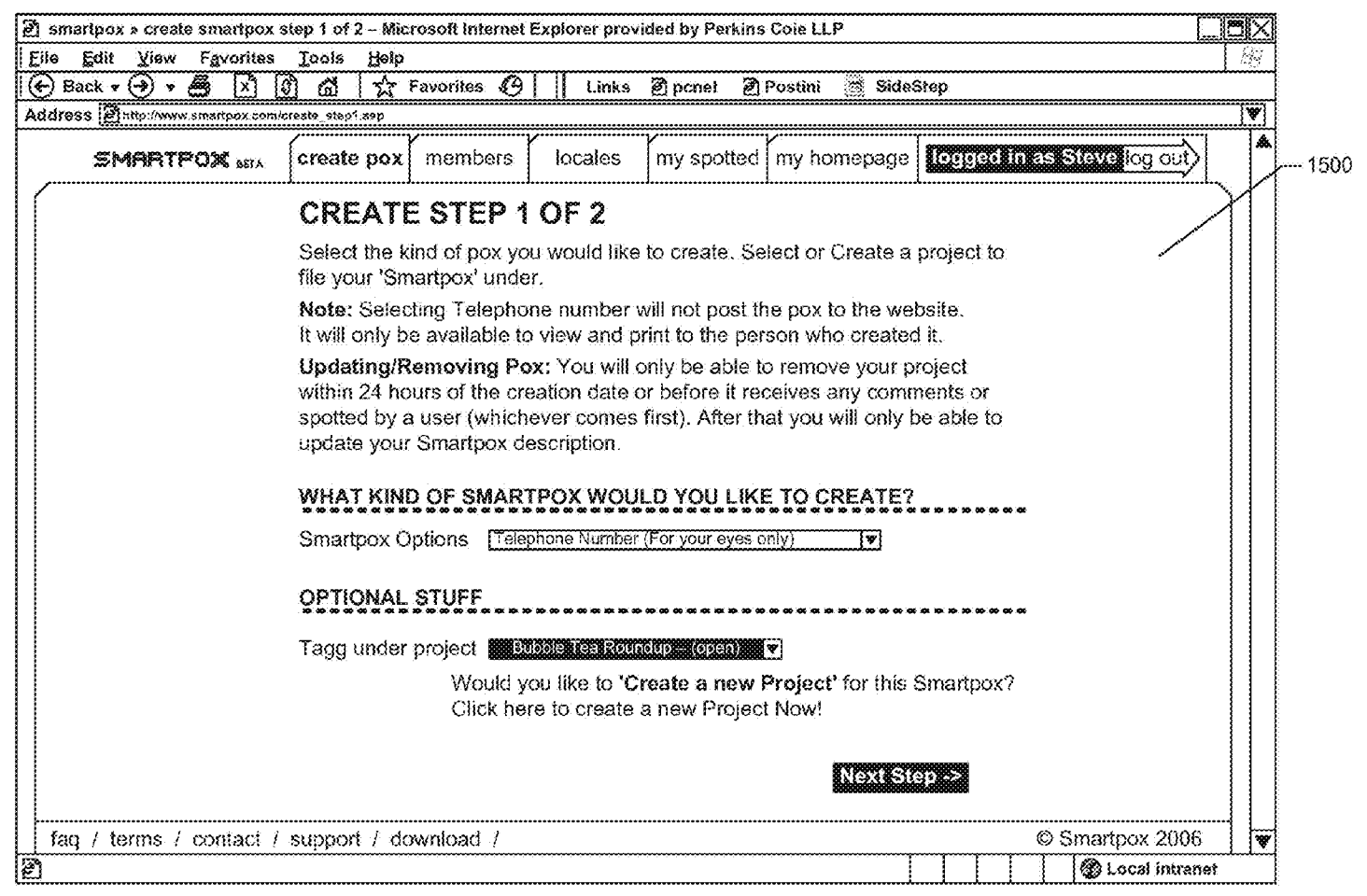
Figure 16:
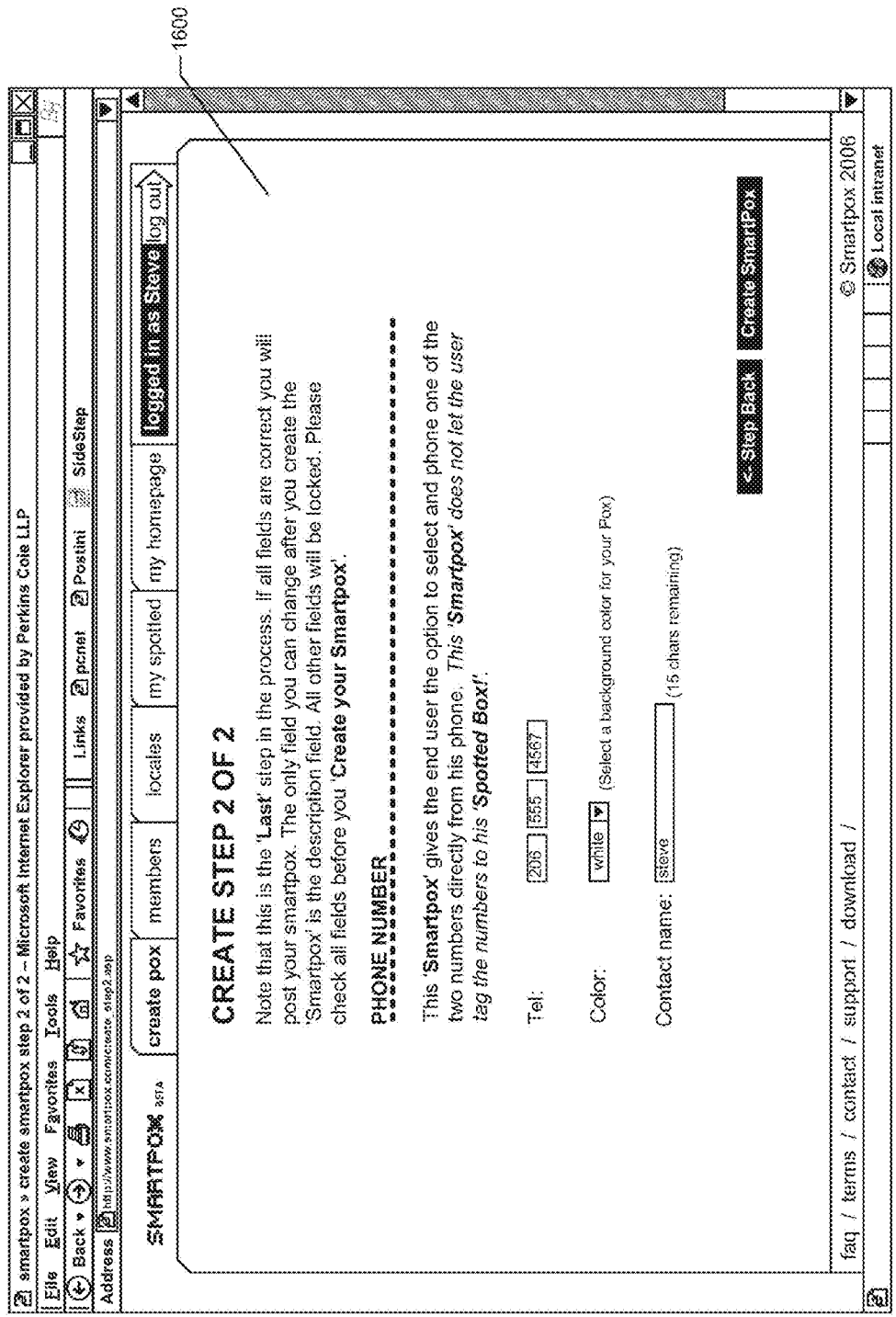
Figure 17:
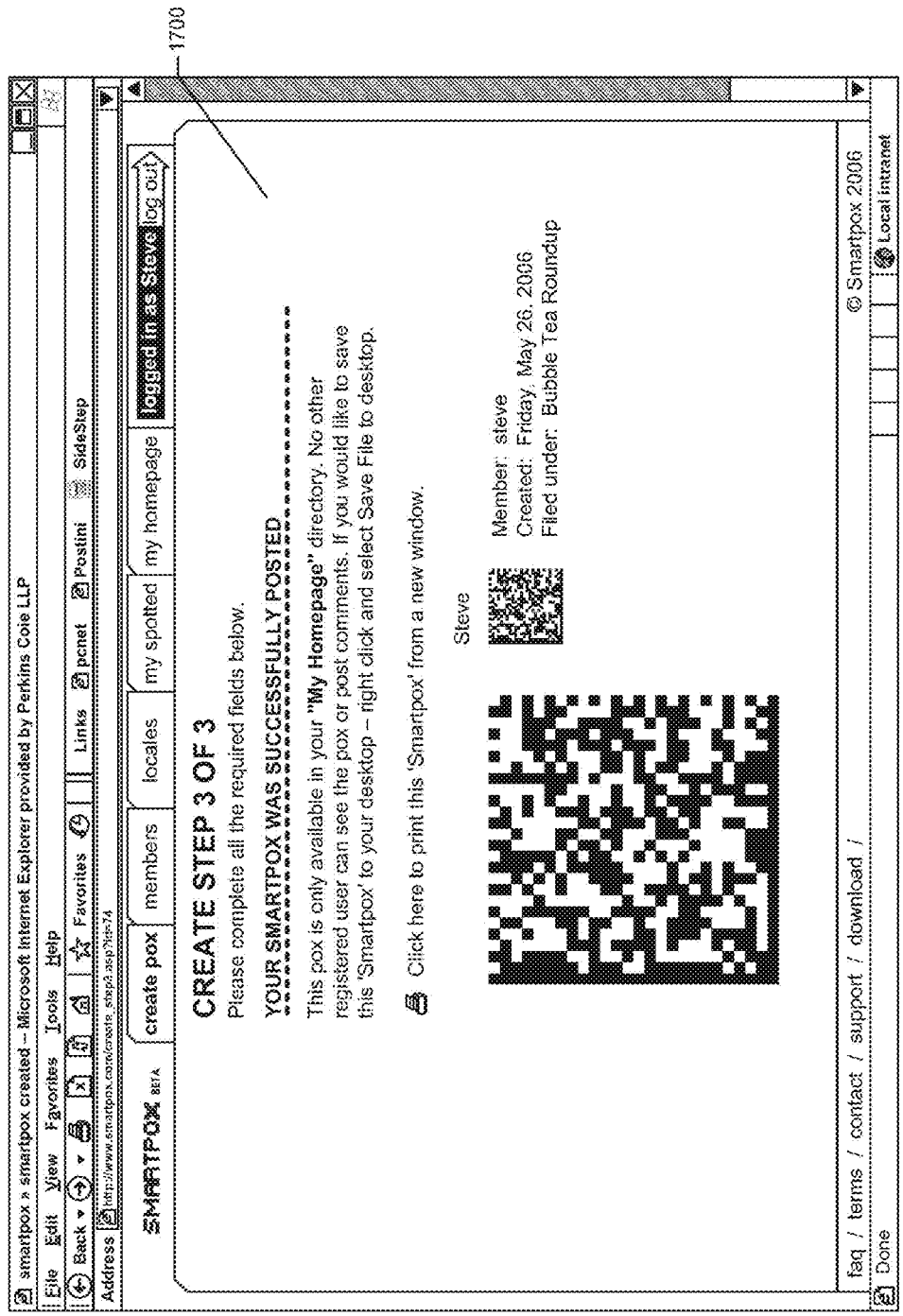

FIGS. 15-17 show displays presented by the facility as part of the creation of a telephone number discussion, whose contents are similar to the displays shown in FIGS. 5-7.

Figure 18:
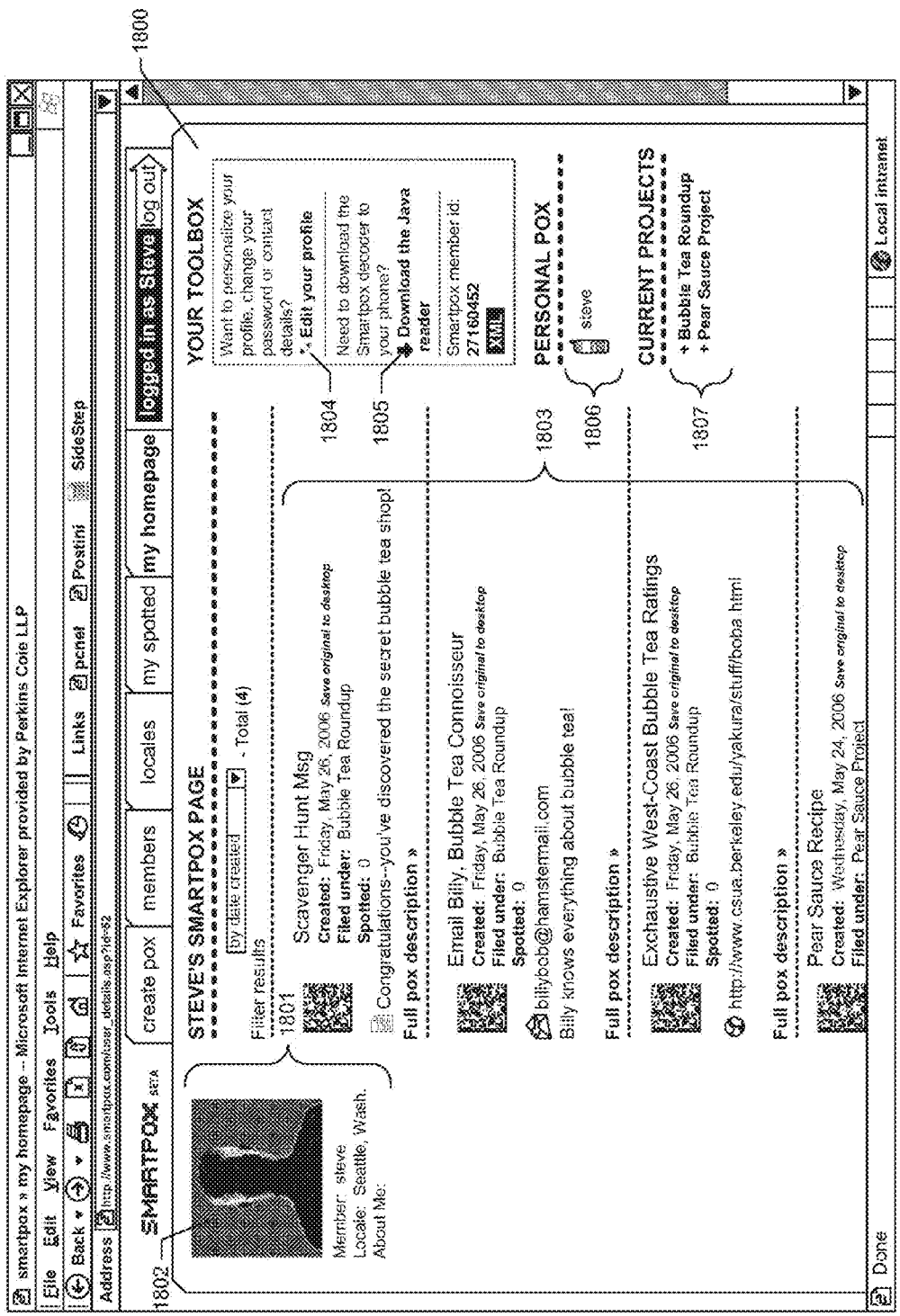

FIG. 18 shows a display presented by the facility when a user selects the "my home page" link. This display 1800 includes information 1801 about the user, in some cases including an image 1802; a list 1803 of discussions created by the user, links for editing the user's profile 1804 and downloading a smart phone symbol capture application 1805, a list of discussions or other information that will not be shared with other participants in the community 1806, and a list of projects created by the user that are active 1807.

Figure 19:
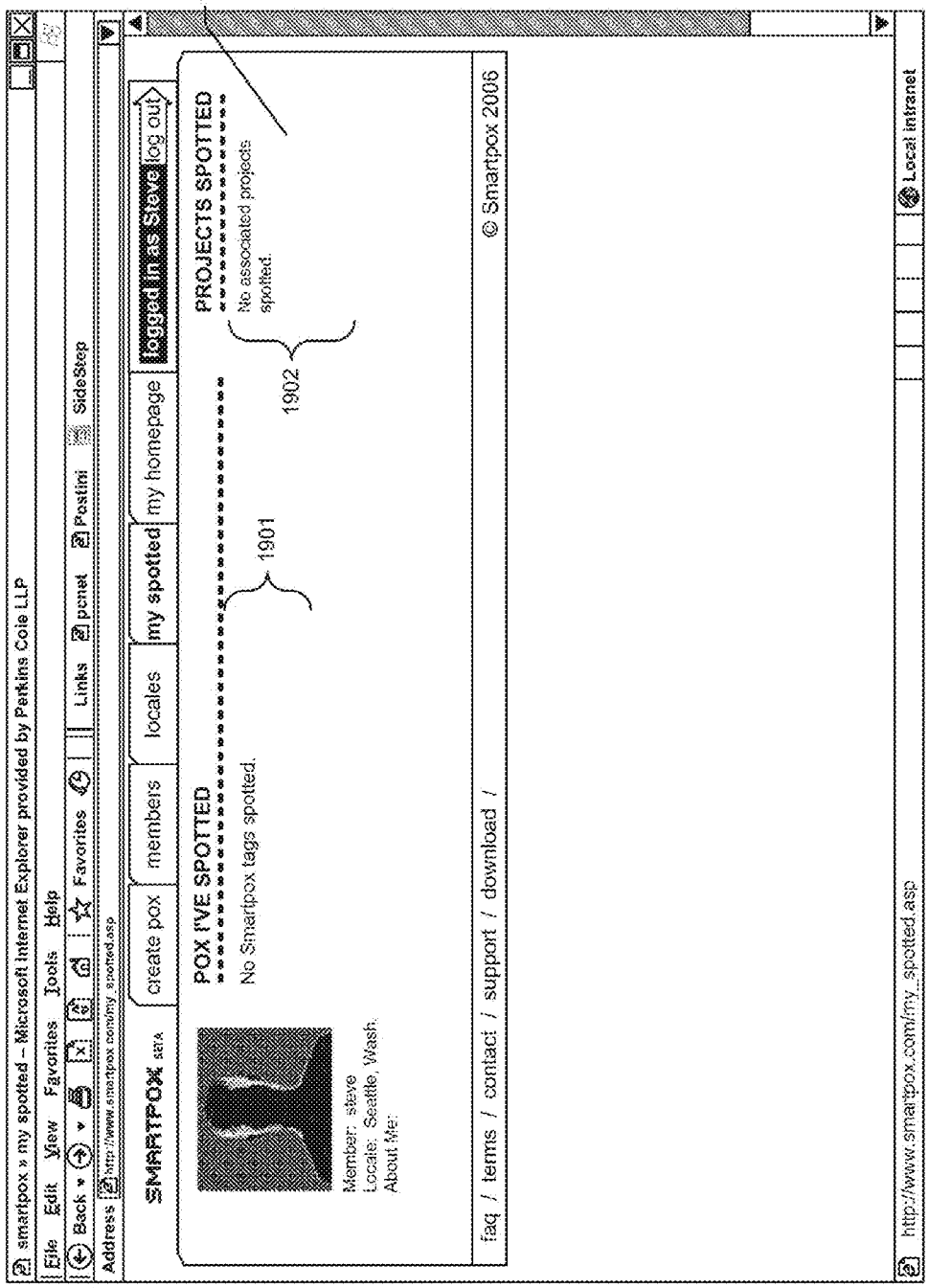

FIG. 19 shows a display presented by the facility when the user selects the "my spotted" link. The display 1900 includes a list 1901 of discussions whose symbols have been captured by the user. Where this list contains discussions, the user may select a discussion in order to view and/or participate in the discussion. The display also contains a list 1902 of projects that contain the symbols captured by the this user.

Figure 20:
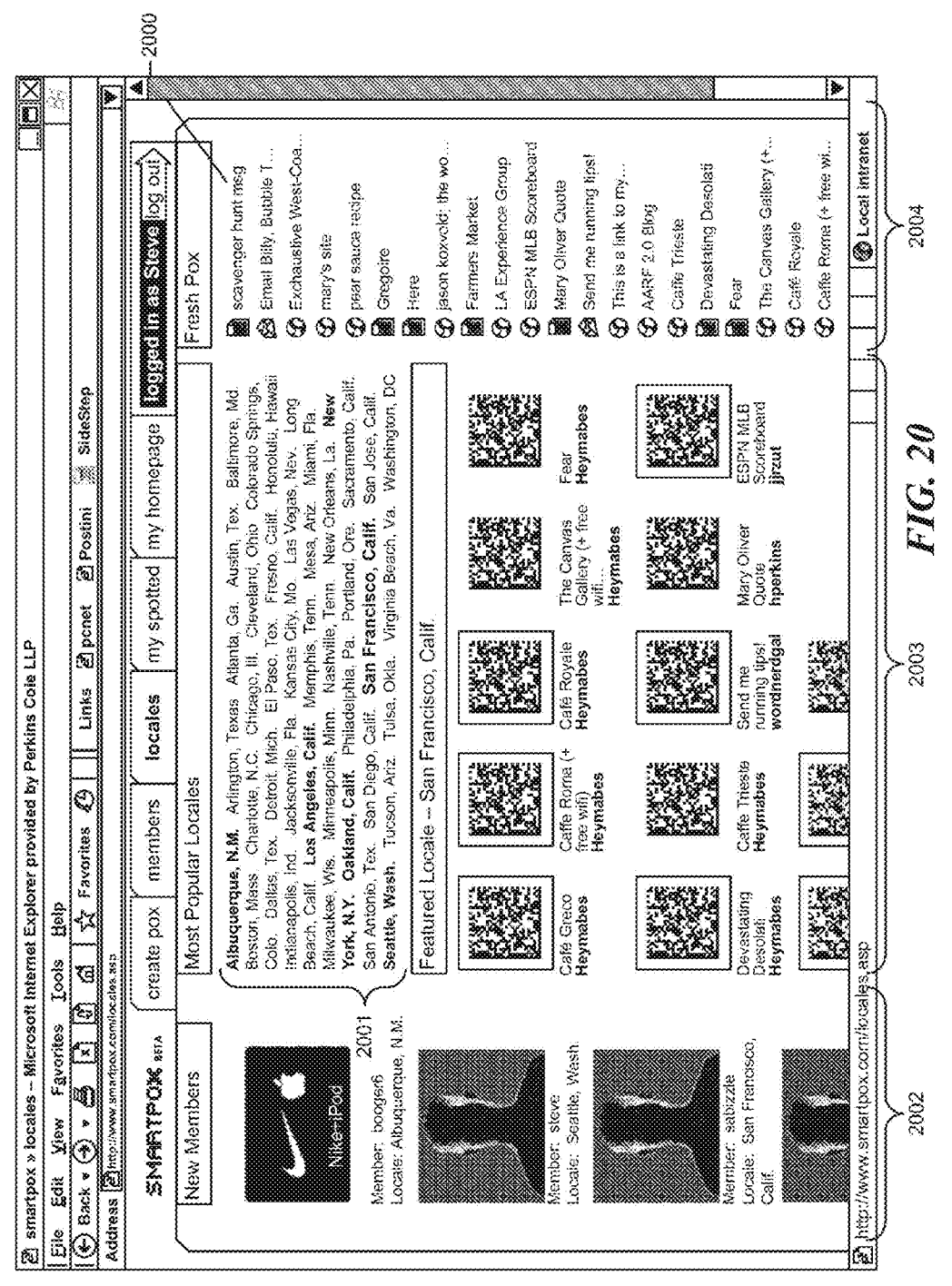

FIG. 20 shows a display presented by the facility when the user selects the "locales" link 214. This display 2000 contains a list 2001 of geographic areas. The user may select one of these areas in order to display a list of discussions relating to that area. The display also includes a list 2002 of new members, a list 2003 of discussions from a featured geographic area, and a list 2004 of recently-created or recently-updated discussions.

Figure 21:
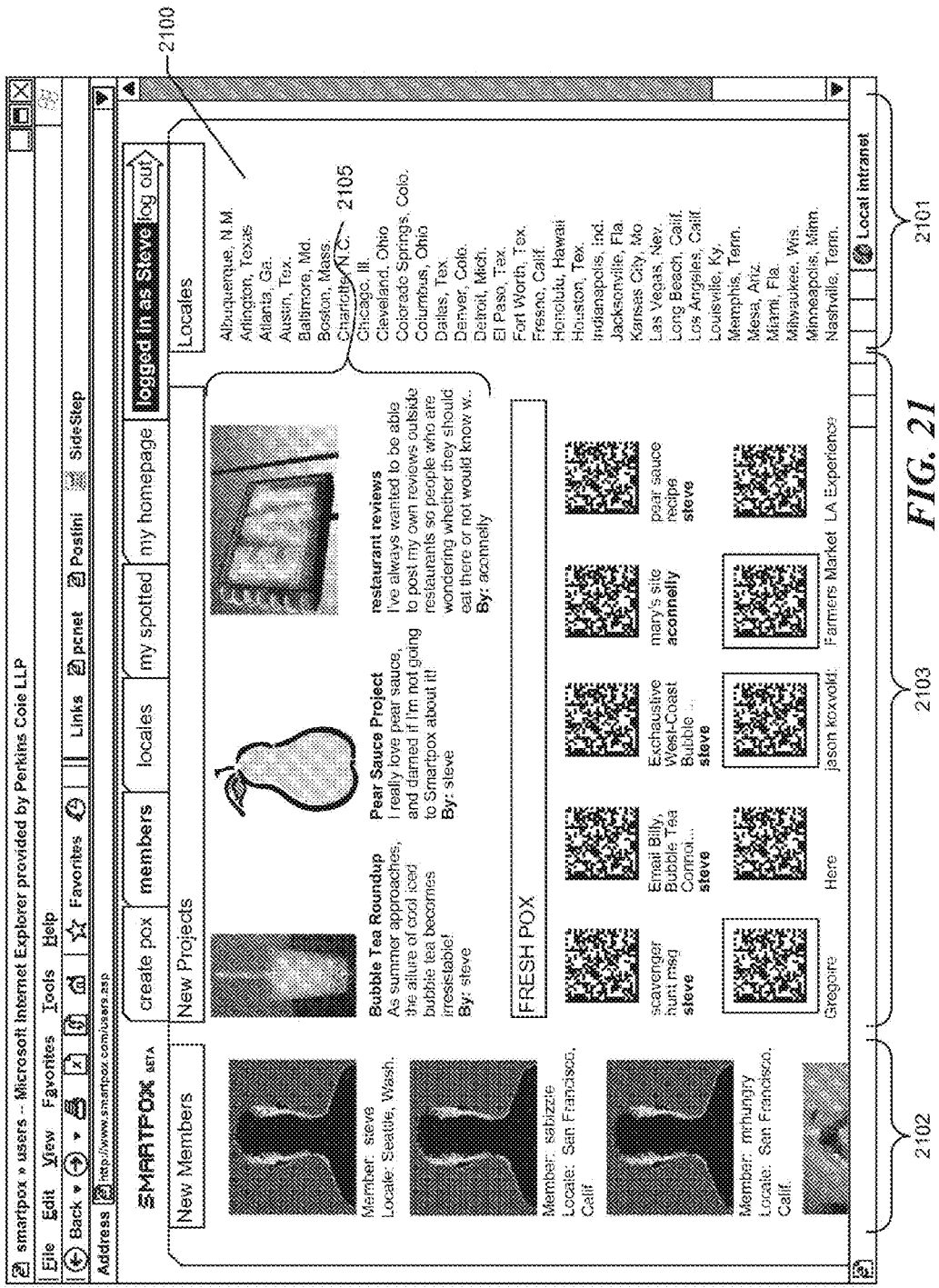

FIG. 21 shows a display presented by the facility when the user selects a "members" link. The display 2100 includes a list 2102 of new members, a list 2105 of new projects, a list of new discussions 2103, and a list of locales 2101. The user may select one of the listed locales in order to display a list of members in that locale.

Figure 22:
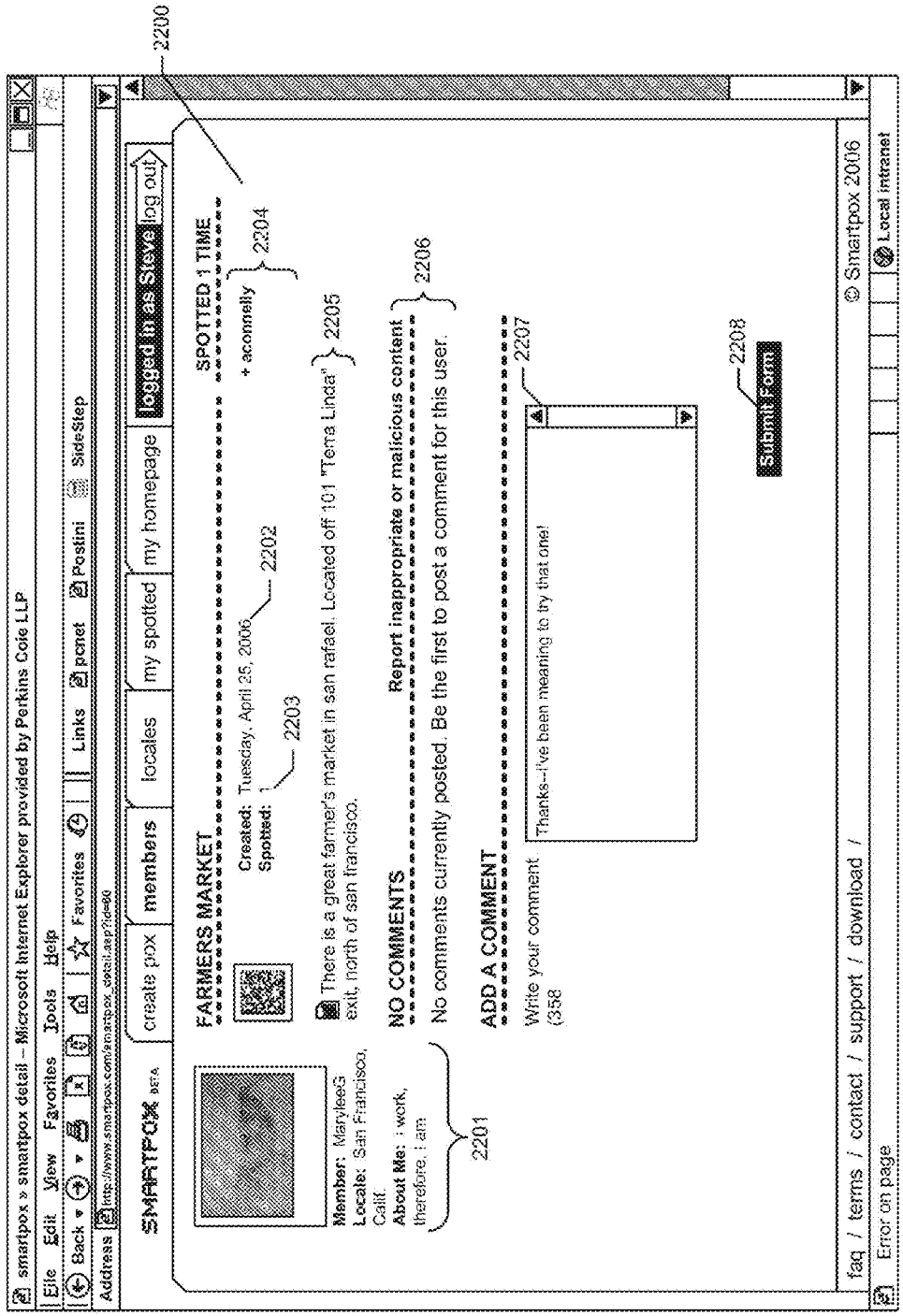

FIG. 22 shows a display presented by the facility when the user selects a "farmer's market" discussion in FIG. 21. The display 2200 includes information 2201 about the member who created this discussion, an indication of the date 2202 on which the discussion was created and the number of users 2203 who have captured the symbol for this discussion, a list 2204 of users who have captured the symbol, an original textual message provided by the user who created the discussion 2205, an (empty) list 2206 of comments posted as part of the discussion, a field 2207 that the present user may use to provide a comment as part of the discussion, and a submit form button 2208 that the user can select to submit the comments.

Figure 23:
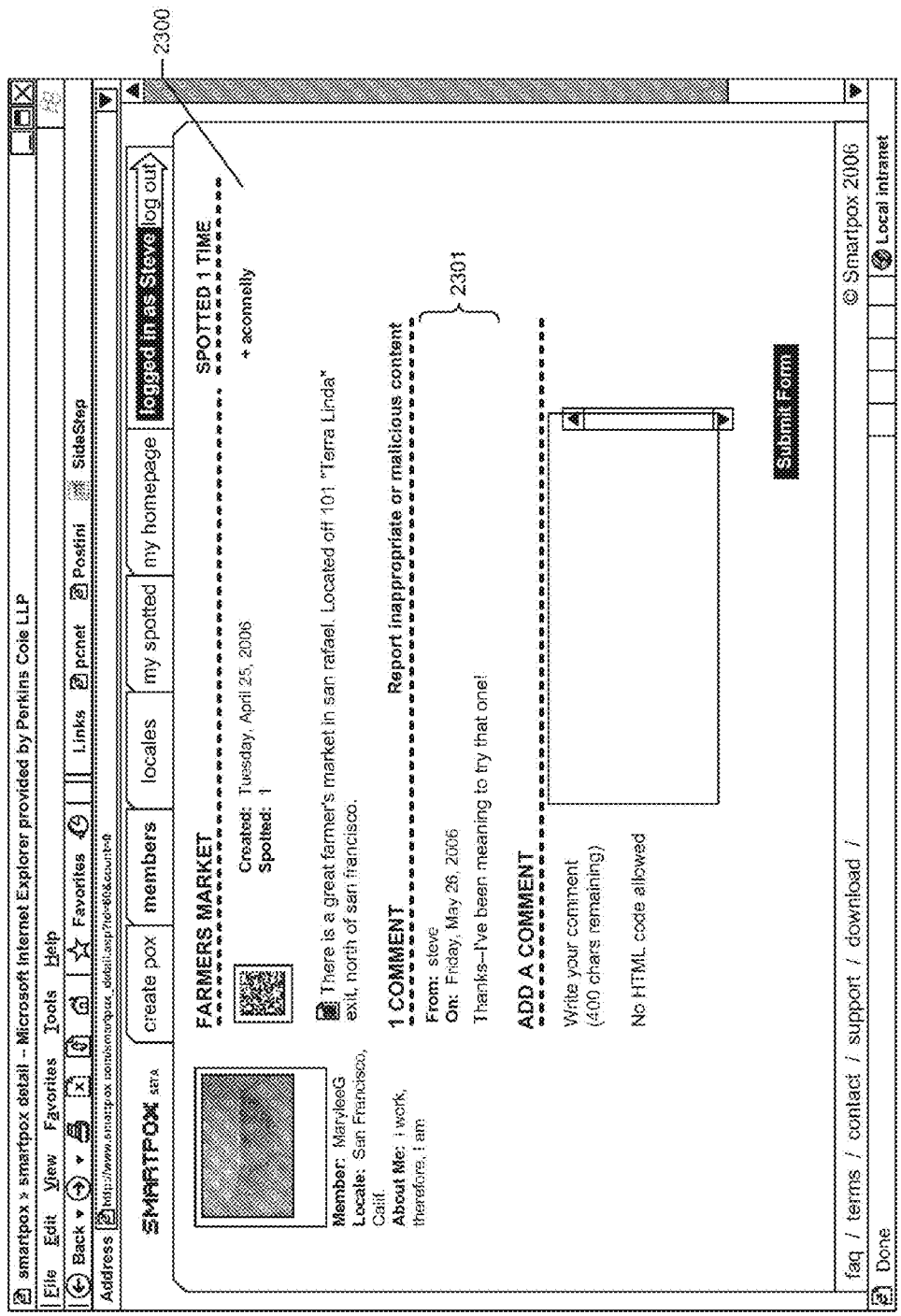

FIG. 23 shows a display presented by the facility when the user selects the submit form button in FIG. 22. This display 2300 shows that the facility has added the comment 2301 created in FIG. 22 to the discussion. In various embodiments, users can participate in a discussion in a variety of other ways, such as uploading new content of a variety of types, editing or annotating existing content for the discussion, etc.

Figure 24:
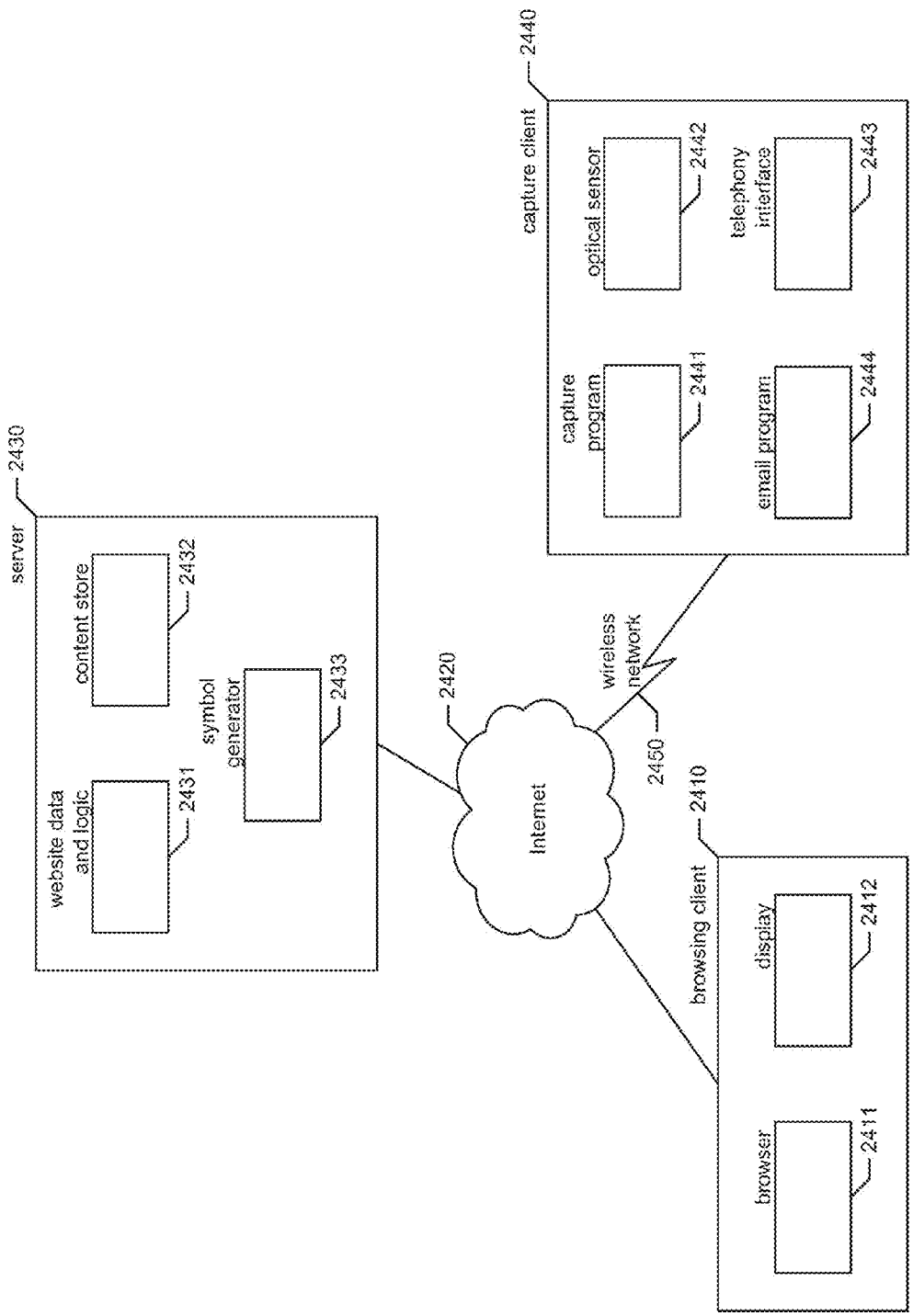
FIG. 24 is a network diagram showing some of the devices that are used in connection with some embodiments of the facility.

FIG. 24 is a network diagram showing some of the devices that are used in connection with some embodiments of the facility. A browsing client such as desktop computer, a laptop computer, a personal digital assistant, or another device capable of executing a web browser includes at least a web browser 2411 and a display 2412. A user of the browsing client can connect via the Internet 2420 to a server 2430 hosting the online community website and the facility. The server contains data and logic 2431 for the community website, a content store 2432 for content created and/or uploaded as part of a discussion, and a symbol generator module 2433 for generating computer-readable symbols. In various embodiments, the facility uses a variety of symbol generation and decoding schemes, such as the Data Matrix scheme promoted by IDAutomation.com, Inc. of Tampa, Fla. and described at the URL corresponding to idautomation.com/datamatrixfaq.html which is hereby incorporated by reference in its entirety. Various embodiments of the facility incorporate a variety of symbol generator modules, such as the Barcodesoft Data Matrix Encoder available from Barcodesoft of Scarborough, Ontario, Canada at the URL corresponding to barcodesoft.com/contact.aspx. The server permits a user of the browsing client to create a new discussion, upload content for the discussion into the content store, and use the symbol generator module to generate a symbol identifying the discussion. The user can then make rendered copies of the generated symbol available for other users of the community to capture using a capture client 2440.

The capture client, such as a cellular phone, PDA, etc., has installed on it a capture program 2441 available from the community website. A user of the capture client executes the capture program to use an optical sensor 2442 included in the capture client to capture an image of a rendered symbol representing a discussion, decode the symbol, and take some action in response. For many discussions, the capture program uses a wireless network 2450 to send to the server via the Internet an indication that the user associated with the capture client has captured the symbol for a particular discussion. In some embodiments, this indication sent by the capture client to the server includes the user's user name to associate the indication with the user or another identifier for the user generated by or in connection with the facility. In other embodiments, the facility uses other information to associate the indication with the user, such as the telephone number of the phone, or a hardware identifier or serial number of the phone or a component thereof. When the server receives the indication, it stores the indication, which is then available both via the user's user page, and via the discussion page for the captured symbol. In some embodiments, the user may use the capture client to go on to immediately participate in the discussion corresponding to the captured symbol. In cases where the capture program is used to capture a symbol having contents that are immediately actionable by the capture client, the capture program automatically causes this action to proceed, or prompts the user as to whether the user wishes this action to proceed. For example, where a telephone number is encoded in a captured symbol, the capture program causes a telephony interface 2443 of the capture client to dial the telephone number. Similarly, where the symbol encodes an email address, the capture program causes an email program 2444 installed on the capture client to address a new email message to the encoded address. Also, by virtue of the fact that the captured symbol and its discussion is noted by the facility on the capturing user's user page, the user may instead visit that user page at a future time, using either the capture client or the browsing client, to take actions associated with the symbol and/or its discussion.

Figure 25:
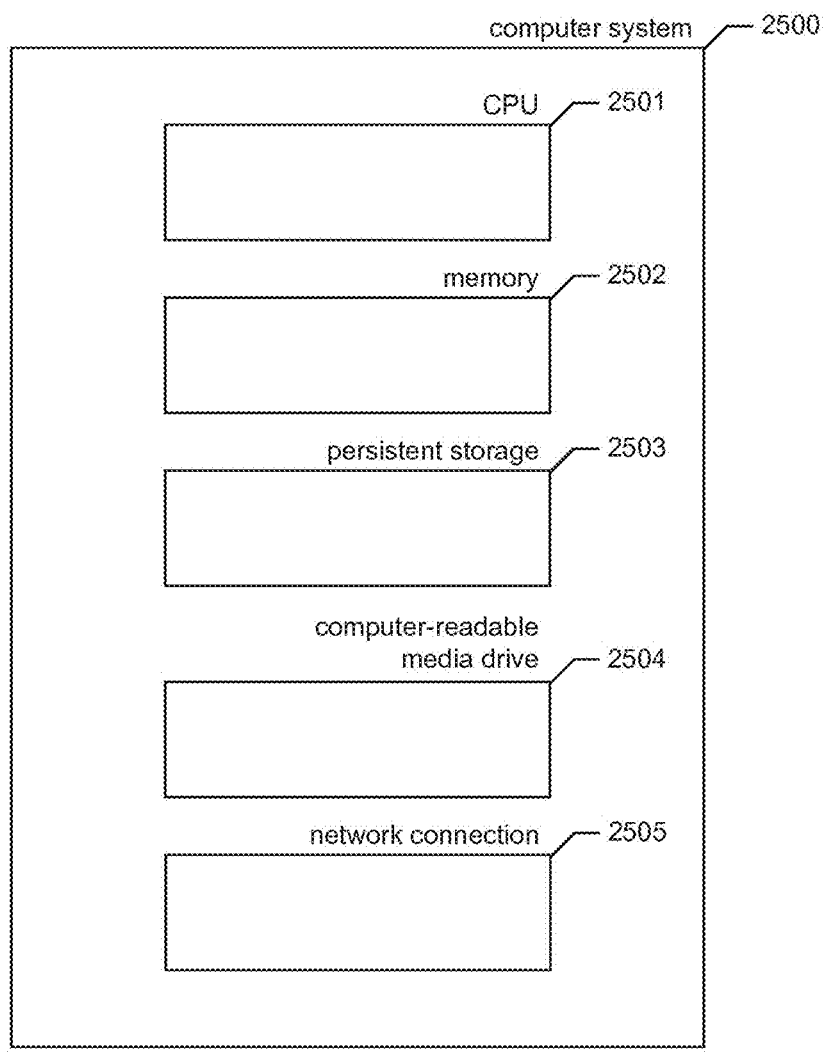
FIG. 25 is a block diagram showing some of the components typically incorporated in at least some of the computer systems and other devices on which the facility executes.

FIG. 25 is a block diagram showing some of the components typically incorporated in at least some of the computer systems and other devices on which the facility executes. These computer systems and devices 2500 may include one or more central processing units ("CPUs") 2501 for executing computer programs; a computer memory 2502 for storing programs and data—including data structures, database tables, other data tables, etc.—while they are being used; a persistent storage device 2503, such as a hard drive, for persistently storing programs and data; a computer-readable media drive 2504, such as a CD-ROM drive, for reading programs and data stored on a computer-readable medium; and a network connection 2505 for connecting the computer system to other computer systems, such as via the Internet, to exchange programs and/or data—including data structures. In various embodiments, the facility can be accessed by any suitable user interface including Web services calls to suitable APIs. While computer systems configured as described above are typically used to support the operation of the facility, one of ordinary skill in the art will appreciate that the facility may be implemented using devices of various types and configurations, and having various components.

A description of the user's interaction with the community in some embodiments of the facility follows.

A user signs up as a member of the community using its website. The user is sent a sign up confirmation code to the phone number entered. Upon receiving the code on his or her mobile phone, the user enters the code on the site.

The user then downloads the Smartpox phone application to his phone. Upon successful installation the user runs the application and is prompted for his user id. His member id was generated by the facility based on his profile at the community website.

After entering his 6-digit member id on his phone, the Smartpox phone application restarts and is now fully personalized based on the user's site profile.

When the user spots a Smartpox code out in the world, the user launches the Smartpox phone application and decodes the Smartpox with the phone reader. When the phone detects a Smartpox code, it will prompt the user with options based on the kind of data that was encoded from the community website.

The type/kind of data can be summed up in 2 approaches: 1) The data is presented upon successful decoding; 2) The user is given the option to 'tag' the decoded data to his or her user page at the community website.

If the type of data is 'static,' the facility displays it directly on the phone, without the need to go online to retrieve the remaining data or personalized data.

When the user selects the option to 'tag' this data to his the community website profile, the user's phone will connect to smartpox.com and verify the user's member id and link the data from the user's phone with the data on the site. The user will then be giving the option to view to content/data or to disconnect.

At any/all given times, the community website is aware of exactly who 'spotted/captured/decoded' data that was linked back to the community website from the members phone. This is due to the Smartpox client having been paired with the members profile on the community website. The phone client has the capability to both push and pull data personalized or anonymously from the community website.

The client can be installed directly from the phone or my transferring it from the user's laptop/desktop workstation after the user downloads it.

In some embodiments, the facility can present advertising messages to a user based on the set of symbols that the user has captured, other actions performed by the user in connection with the community generated by the facility and/or user registration information. For example, a user who has captured a symbol relating to an ultimate Frisbee tournament might receive an advertising message promoting a new flying disc model; a user who has captured a symbol relating to a gourmet cooking group and who has selected San Francisco as his or her locale during registration may receive an advertising message for a San Francisco kitchen equipment store; and a user who has captured a symbol for a Shinto discussion group and commented in a discussion about anime may receive an ad for Japan travel services. The facility may present these ads via the capture client, within the context of the community website, or via some other channel. The facility may present advertising messages directly in response to a user action that qualifies the user to receive an advertising message, or at some later time.

In some embodiments, the capture client generates and/or displays its own symbols, for capture by another user of the community, or by a related party such as a cashier at a store. In some embodiments, the facility uses this capability to generate machine-readable coupons, admission tickets, arcade credits, etc. on a user's behalf.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A non-transitory computer readable storage medium storing instructions that, when executed by a computing system, cause the computing system to perform operations comprising:
    capturing, by a device of a user, an image of a machine-readable symbol encoding an identifier, the identifier identifying a locale associated with the machine-readable symbol;
    processing the captured image to discern the identifier encoded into the machine-readable symbol;
    presenting for display on the device an interface for receiving content from the user relating to the locale associated with the machine-readable symbol; and
    receiving, from the user at the device, content relating to the locale.

2. The non-transitory computer readable storage medium of claim 1, further comprising allowing the user of the device to participate in a discussion relating to the content received at the device regarding the locale.

3. The non-transitory computer readable storage medium of claim 1, further comprising providing an advertising message for display to the user of the device, the advertising message selected based upon the locale associated with the machine-readable symbol.

4. The non-transitory computer-readable storage medium of claim 1, wherein the machine readable symbol encoding the identifier is a matrix barcode.

5. The non-transitory computer readable storage medium of claim 1, wherein the interface presented for display allows the user to upload content relating to the locale, and wherein the content received is the uploaded content that is posted for a discussion relating to the locale.

6. The non-transitory computer readable storage medium of claim 1, wherein the interface presented for display allows the user to provide comments relating to the locale, and wherein the content received is the comments that are posted for a discussion relating to the locale.

7. The non-transitory computer readable storage medium of claim 1, wherein the interface presented for display includes a portion that allows the user of the device to edit or annotate existing content of a discussion, and wherein the content received is the edits or annotations.

8. The non-transitory computer readable storage medium of claim 1, wherein the locale is a geographic location of the user capturing the machine-readable symbol.

9. A method comprising:
    capturing, by a device of a user, an image of a machine-readable symbol encoding an identifier, the identifier identifying a locale associated with the machine-readable symbol;
    processing the captured image to discern the identifier encoded into the machine-readable symbol;
    presenting for display on the device an interface for receiving content from the user relating to the locale associated with the machine-readable symbol; and
    receiving, from the user at the device, content relating to the locale.

10. The method of claim 9, further comprising allowing the user of the device to participate in a discussion relating to the content received at the device regarding the locale.

11. The method of claim 9, further comprising providing an advertising message for display to the user of the device, the advertising message selected based upon the locale associated with the machine-readable symbol.

12. The method of claim 9, wherein the machine readable symbol encoding the identifier is a matrix barcode.

13. The method of claim 9, presenting for display on the device an interface further comprises presenting an interface via which the user can upload content relating to the locale, and wherein the content received is the uploaded content that is posted as part of a discussion relating to the locale.

14. The method of claim 9, wherein presenting for display on the device an interface further comprises presenting an interface for receiving comments relating to the locale.

15. The method of claim 9, wherein presenting for display on the device an interface further comprises presenting an interface with a list of other users who have also captured an image of the machine-readable symbol.

16. The method of claim 9, wherein presenting for display on the device an interface further comprises presenting an interface with a portion that allows the user of the device to add comments relating to the locale, to upload content relating to the locale, and to edit or annotate existing content relating to the locale.

17. A computing system, comprising:
    a processor of a device of a user;
    an optical sensor in communication with the processor and configured for capturing, by a device of a user, an image of a machine-readable symbol encoding an identifier, the identifier identifying a locale associated with the machine-readable symbol; and
    a capture program executed by the processor and configured for:
        processing the captured image to discern the identifier encoded into the machine-readable symbol;
        presenting for display on the device an interface for receiving content from the user relating to the locale associated with the machine-readable symbol; and
        receiving, from the user at the device, content relating to the locale.

18. The computing system of claim 17, wherein the capture program is further configured for sending an indication to a server that the user of the device captured the machine-readable symbol, the indication including a user identifier linking the user to a user profile on the server.

19. The computing system of claim 17, wherein the capture program is further configured for prompting the user of the device to tag information about the locale to a user profile for the user of the device.

20. The computing system of claim 17, wherein the capture program is further configured to provide to the user of the device an interface via which the user can create a discussion and can create a new machine-readable symbol encoding information about the discussion.

* * * * *